Patented May 20, 1941

2,242,497

UNITED STATES PATENT OFFICE 2,242,497

PROCESS OF REMOVING SILICA FROM MINERALS, SLAGS, AND SIMILAR MATERIALS

Eduard Zintl, Darmstadt, Walter Krings, Bitterfeld, and Wilhelm Bräuning, Sandersdorf, Germany, assignors, by mesne assignments, to Walther H. Duisberg, New York, N. Y.

No Drawing. Application April 3, 1939, Serial No. 265,764. In Germany April 8, 1938

5 Claims. (Cl. 23—21)

This invention relates to a process of removing silica from minerals, slags, and similar materials, containing metal oxides, for the purpose of recovering the latter.

Hitherto the removal of silica from materials of the foregoing kind, which is generally necessary in order to recover the metal oxides by decomposition of such materials, has entailed complicated and expensive chemical operations.

The present invention aims at providing a simple and inexpensive process of removing silica from materials of the foregoing kind, which is particularly applicable to materials containing difficultly volatilisable metal oxides such as alumina, zircon or beryllium oxide.

To this end, according to the invention, silica is removed from minerals, slags, and similar materials containing difficultly volatilisable metal oxides, by causing said silica to react with silicon at a high temperature and to volatilise as silicon monoxide.

This reaction can be represented by the following equation:

$$Me_xO_y \cdot nSiO_2 + nSi = Me_xO_y + 2nSiO$$

where $Me_xO_y$ represents the difficultly volatilisable metal oxide.

From the foregoing equation it will be apparent that the silicon content of the reaction mixture is volatilised in the form of silicon monoxide, leaving a residue substantially free from silica or silicon compounds, from which residue the metal oxide can be recovered without difficulty.

The volatilisation of the silicon monoxide is carried out at temperatures above about 1250° C. and can be favourably influenced by using a reduced pressure or a vacuum.

Since, under the conditions of operation certain metal oxides, which may be present in the material to be treated, are reduced by silicon, the amount of silicon added to the material to be treated in accordance with the invention should be sufficient also to reduce such metal oxides and to convert all the silica present or formed by the reduction of such metal oxides, into silicon monoxide.

The following examples will serve to illustrate the process of the present invention. In said examples, the parts referred to are parts by weight.

EXAMPLE I

Removal of silica from clay 25 parts of clay previously burnt at 600° C. for 2 hours and consisting of:

| | Per cent |
|---|---|
| $Al_2O_3$ | 40.9 |
| $SiO_2$ | 36.9 |
| $Fe_2O_3$ | 0.6 | balance mainly volatile impurities, were intimately ground together with 7 parts of silicon (98.5% of Si) and heated for 2 hours at a temperature of 1450° C. in a high vacuum of 0.001 to 0.0001 mm. absolute mercury pressure. As a result of this heating, 21 parts of the mixture were volatilised in the form of a sublimate rich in silicon whereas 11 parts remained as residue which contained besides alumina, only small quantities of metallic iron (corresponding to the iron content of the original clay) and 0.2% of silicon.

EXAMPLE II

Removal of silica from zirconium ore 120 parts of zirconium ore of the following composition:

| | Per cent |
|---|---|
| $SiO_2$ | 22.5 |
| $Fe_2O_3$ | 4.0 |
| $TiO_2$ | 1.2 |
| $ZrO_2$ | Balance | were intimately mixed with 16.1 parts of commercial silicon (98% of Si) and heated for 4 hours at a temperature of 1420° C. under an absolute pressure of less than 0.01 mm. of mercury. A sublimate was obtained which contained 56.5% of Si and 0.5% of $ZrO_2$ besides traces of iron. The quantity of silicon in the sublimate corresponds to 88.7% of SiO. The residue, amounting to 90.8 parts, contained only 0.5% of $SiO_2$.

EXAMPLE III

Removal of silica from beryl 250 parts of a beryl ore of the following composition:

| | Per cent |
|---|---|
| BeO | 14.0 |
| $Al_2O_3$ | 14.0 |
| $SiO_2$ | 62.0 |
| $Fe_2O_3$ | 1.6 |
| MnO, MgO, CaO, $TiO_2$ | Balance | were intimately mixed with 105.2 parts of amorphous silicon (91% of Si) and heated for 4 hours at a temperature of 1420° C. under an absolute pressure of less than 0.01 mm. of mercury. 260 parts of a sublimate were obtained which contained 59.9% of SiO, 0.73% of $Al_2O_3$ and 0.23% of $Fe_2O_3$. No BeO could be found in this sublimate. The unvolatilised residue, amounting to 80 parts, had the following composition:

| | Per cent |
|---|---|
| BeO | 42.15 |
| $Al_2O_3$ | 51.7 |
| Fe | 2.3 |
| Elementary Si | 1.45 |
| $SiO_2$ | 0.0 |

The iron which is present in a very finely divided metallic state in the residue can easily be removed by known methods.

We claim:

1. A process of removing silica from minerals, slags, and similar materials containing difficultly volatilizable metal oxides chemically combined as silicates, said metal oxides being difficultly reducible with silicon which comprises adding silicon to such materials heating the mixture of materials and silicon to temperatures above 1250° C. under a vacuum thereby decomposing the silicate in the material with the formation of silicon monoxide, removing the silicon monoxide from the material as a gas and leaving the oxides as a residue.

2. A process of removing silica from clay for the purpose of recovering alumina which comprises adding silicon to said clay, heating the mixture of clay and silicon to temperatures above 1250° C. under a vacuum thereby decomposing the silicates in the clay with the formation of silicon monoxide, removing the silicon monoxide from the material as a gas and leaving the alumina as a residue.

3. A process of removing silica from zirconium ore for the purpose of recovering zirconium compounds which comprises adding silicon to said zirconium ore, heating the mixture of zirconium ore and silicon to temperatures above 1250° C. under a vacuum thereby decomposing the silicates in the zirconium ore with the formation of silicon monoxide, removing the silicon monoxide from the material as a gas and leaving the zirconium compounds as a residue.

4. A process of removing silica from beryl for the purpose of recovering beryllium compounds which comprises adding silicon to said beryl, heating the mixture of beryl and silicon to temperatures above 1250° C. under a vacuum thereby decomposing the silicates in the beryl with the formation of silicon monoxide, removing the silicon monoxide from the material as a gas and leaving the beryllium compounds as a residue.

5. A process of removing silica from minerals, slags and similar materials containing difficultly volatilizable metal oxides chemically combined as silicates, said metal oxides being difficultly reducible with silicon which comprises adding silicon to such materials, the amount of silicon added being sufficient to reduce any metal oxides present which are reducible by silicon under the conditions of operation and to volatilize any silica formed by said reduction as well as the silica originally present as silicate in said material in the form of silicon monoxide, heating the mixture of materials and silicon to temperatures above 1250° C. under a vacuum thereby decomposing the silicate in the material with formation of silicon monoxide and reducing the reducible metal oxides, removing the silicon monoxide from the material as a gas leaving the difficultly reducible oxides and the reduction product of the reducible metal oxides as a residue.

EDUARD ZINTL.
WALTER KRINGS.
WILHELM BRÄUNING.